United States Patent [19]

Powers

[11] Patent Number: 5,352,257
[45] Date of Patent: Oct. 4, 1994

[54] OVERSPRAY COLLECTION BAFFLE

[75] Inventor: Harold R. Powers, St. John, Ind.

[73] Assignee: The Sherwin-Williams Company, Cleveland, Ohio

[21] Appl. No.: 134,039

[22] Filed: Oct. 8, 1993

[51] Int. Cl.$^5$ .............................................. B01D 45/06
[52] U.S. Cl. ........................................ 55/444; 55/446; 55/DIG. 46; 454/53
[58] Field of Search ................................ 55/442–446, 55/DIG. 46; 454/50, 53

[56] References Cited

U.S. PATENT DOCUMENTS

| | | | |
|---|---|---|---|
| 2,788,954 | 4/1957 | Paasche | 55/444 X |
| 3,813,856 | 6/1974 | Jensen | 55/446 X |
| 3,834,135 | 9/1974 | Jordan | 55/444 |
| 3,932,151 | 1/1976 | Lau | 55/229 |
| 4,175,935 | 11/1979 | Gutermuth et al. | 55/443 X |
| 4,222,319 | 9/1980 | Donahue | 98/115 SB |
| 4,239,512 | 12/1980 | Dobias | 55/90 |
| 4,276,064 | 6/1981 | Gerdes | 55/217 |
| 4,295,866 | 10/1981 | Kearny | 55/228 |
| 4,328,012 | 5/1982 | Telchuk, Jr. et al. | 55/90 |
| 4,399,742 | 8/1983 | Dobias | 98/115 |
| 4,431,435 | 2/1984 | Dorsch et al. | 55/241 |
| 4,440,554 | 4/1984 | Perry | 55/241 |
| 4,475,447 | 10/1984 | Kock et al. | 98/115 SB |
| 4,484,513 | 11/1984 | Napadow | 98/115 SB |
| 4,521,227 | 6/1985 | Gerdes et al. | 55/225 |
| 4,567,818 | 2/1986 | Napadow | 98/115.2 |
| 4,585,557 | 4/1986 | Turnquist | 210/320 |
| 4,601,236 | 7/1986 | Napadow | 98/115.2 |
| 4,607,592 | 8/1986 | Richter | 118/689 |
| 4,608,064 | 8/1986 | Napadow | 55/238 |
| 4,620,858 | 11/1986 | Bradshaw et al. | 55/222 |
| 4,704,952 | 11/1987 | Johnson et al. | 98/115.2 |
| 4,885,010 | 12/1989 | Rich et al. | 55/241 |
| 4,927,437 | 5/1990 | Richerson | 55/349 |
| 4,973,341 | 11/1990 | Richerson | 55/127 |

*Primary Examiner*—Charles Hart
*Attorney, Agent, or Firm*—Steven W. Tan; Robert E. McDonald; James A. Hudak

[57] ABSTRACT

A baffle assembly for intercepting paint particles passing through a spray booth is disclosed. The baffle assembly includes an inner plate and an outer plate adjacent each end or edge of the inner plate. The inner plate is comprised of a central planar portion, which is oriented substantially perpendicular to the direction of air flow, and having outer ends which are curved in an upstream direction and inwardly toward one another. Each outer plate includes a curved portion which terminates in a semi-circular portion. The inner plate is received and positioned within the outer plates so that each of its outer ends is substantially surrounded by and equidistant from its adjacent outer plate. In this manner, air flows between the inner plate and the outer plate in a first curved direction and then in a second opposite curved direction.

13 Claims, 4 Drawing Sheets

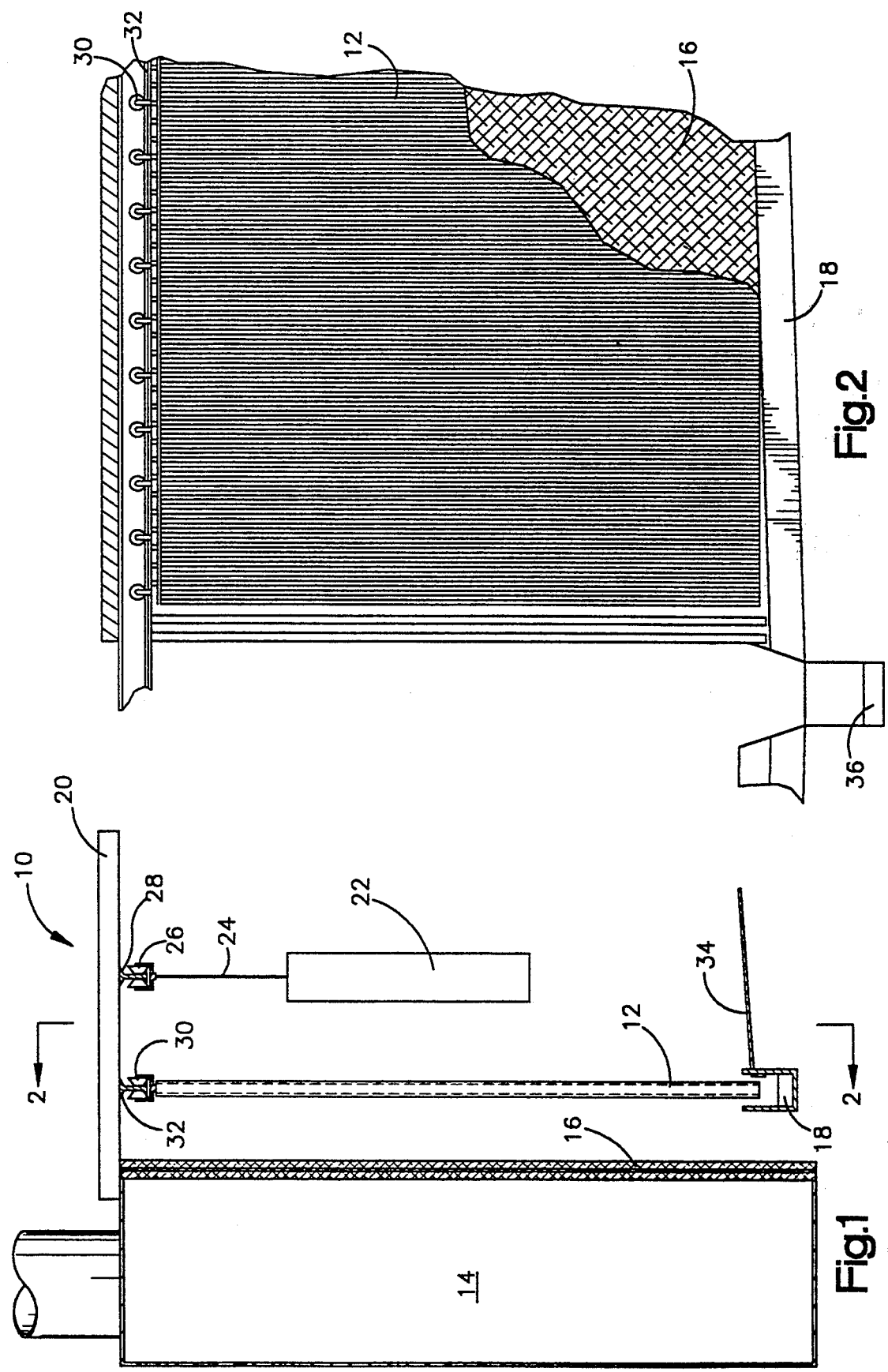

OVERSPRAY COLLECTION BAFFLE

TECHNICAL FIELD

The present invention relates, in general, to a baffle assembly for removing paint particles from the air passing through a paint spray booth and, more particularly, to a baffle assembly having a unique configuration resulting in a significant increase in the amount of paint particles removed from the air in the spray booth.

BACKGROUND ART

Paint spray methods can be classified into three categories. The first method utilizes air atomization wherein the paint particles are mixed with the air being ejected from the spray gun. The second method is actually airless atomization wherein the paint is atomized and propelled by hydraulic pressure toward the product being painted. The third method utilizes electrostatic principles wherein the paint is atomized by either the air or airless approach and then deposited on the product being painted by electrical attraction. Regardless of the paint spray method utilized, a spray booth is usually employed to minimize overspray into the surrounding environment.

Paint spray booths are typically designed to provide a relatively safe working environment and to minimize the overspray of paint and any solvents into the atmosphere. The utilization of a paint spray booth also usually improves the resulting paint finish on the product. The objective is to maintain a relatively constant air flow through the booth so that the paint particles and any solvents will be directed away from any workers within the booth to minimize their exposure to same. The Occupational Safety and Health Administration has established standards with respect to such exposure. In addition, environmental standards require that emissions from paint spray booths not exceed a certain level. Thus, the use of booths is usually required by federal and/or state regulatory agencies.

To remove paint particles and solvents from the air passing through a spray booth, a baffle arrangement is usually positioned within the booth so as to be between the article being painted and the booth exhaust system. In a "dry booth" application, filters are utilized to collect any overspray which passes through the baffle arrangement. Such filters trap most of the paint particles which pass through the baffle arrangement preventing the particles from being exhausted into the atmosphere. The disadvantage of using filters is that they become clogged with paint particles and require frequent replacement. When clogging occurs, the air flow through the booth is reduced thus decreasing the air flow past the worker within the booth. In "waterwash" booths, various types of water-capturing curtains or devices are located behind the baffle arrangement in order to capture any paint particles which pass through same. An inherent disadvantage of waterwash booths is that a sludge comprised of paint particles builds up and must be disposed of. Thus, the efficiency of the baffle arrangement utilized has a direct effect on the frequency which filters must be replaced in a dry booth application and on the frequency which sludge must be removed in a waterwash booth.

In view of the effect of baffle efficiency on the frequency of filter replacement in a dry booth application and the frequency of sludge removal in a waterwash booth, numerous baffle arrangements have been designed and fabricated. For example, one prior art baffle arrangement is comprised of V-shaped baffles which are staggered and alternately inverted with respect to one another. Another prior art baffle arrangement utilizes U-shaped baffles similarly staggered and alternately inverted with respect to one another. A still another prior art baffle arrangement utilizes baffles in a spiral configuration in order to impart "cyclonic flow" to the air stream passing therethrough. All of the foregoing designs have some inherent disadvantages either with respect to ease of production, cost, and/or efficiency of removing paint particles from the air stream passing therethrough.

In view of the foregoing, it has become desirable to develop a baffle assembly which is relatively inexpensive and simple to produce, has a high collection efficiency, and which can be easily retrofitted into existing paint spray booths whether of the dry or waterwash type.

SUMMARY OF THE INVENTION

The present invention solves the problems associated with the prior art baffles by providing a baffle assembly which has a very high collection efficiency, is relatively inexpensive and simple to produce, and can be retrofitted into both dry and waterwash type spray booths. The baffle assembly of the present invention is comprised of an inner plate, a right outer plate, and a left outer plate. The inner plate is comprised of a longitudinally extending planar portion, which is oriented substantially perpendicular to the direction of air flow, and longitudinally extending outer ends which are curved in an upstream direction and inwardly toward each other. Each outer end terminates in a longitudinally extending straight portion. Right outer plate and left outer plate are each comprised of a longitudinally extending curved portion, a longitudinally extending straight portion and a longitudinally extending semi-circular portion therebetween. The inner plate is received and positioned within the right outer plate and the left outer plate so that each of its outer ends is substantially surrounded by and equidistant from its adjacent outer plate. In this manner, the paint particles flow between the inner plate and the outer plates in a first curved direction and then in a second opposite curved direction. The resulting baffle assemblies are attached at their upper ends to a monorail trolley system and are interconnected in a vertical blind type arrangement permitting rotation of the baffle assemblies and the "close packing" of same when not in use.

Accordingly, an object of the present invention is to provide a baffle assembly having a unique configuration resulting in a collection efficiency substantially greater than the collection efficiency of baffle assemblies having different configurations.

Another object of the present invention is to provide a baffle assembly which can be suspended and interconnected to similarly suspended baffle assemblies in a vertical blind type arrangement permitting the rotation of the baffle assemblies and the "close packing" of same when not in use.

And still another object of the present invention is to provide a baffle assembly which can be readily retrofitted into existing paint spray booths whether of the dry or waterwash type.

BRIEF DESCRIPTION OF THE DRAWINGS

FIG. 1 is an end elevation view of a typical paint spray booth utilizing baffles to collect overspray and particulates produced during the painting process.

FIG. 2 is a front elevation view, partially broken away in cross-section, of a paint spray booth.

DESCRIPTION OF THE PREFERRED EMBODIMENT

Figure 3:
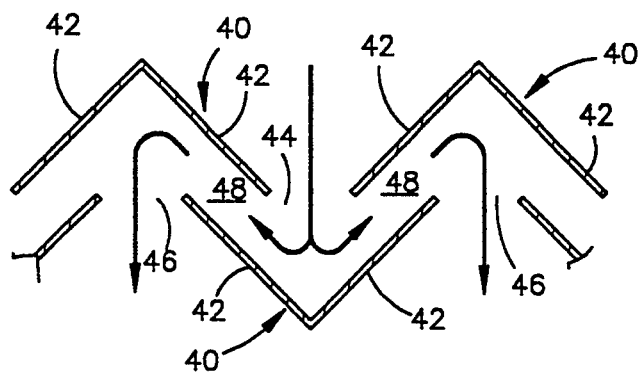
FIG. 3 is a top plan view of a plurality of prior art baffles having a V-shaped configuration.

Referring now to the drawings where illustrations are for the purpose of describing the preferred embodiment of the present invention and are not intended to limit the invention described herein, FIG. 1 is an end elevation view of a typical paint spray booth 10 utilizing baffles to collect overspray and various particulates produced during the painting process. The paint spray booth 10 includes a plurality of vertically oriented baffles 12, an exhaust plenum 14 having a filter 16 across its inlet, a collection trough 18 positioned under the plurality of baffles 12 and a header member 20 utilized to support the baffles 12 and the parts 22 being conveyed through the booth 10 for painting purposes.

Each part 22 being conveyed through the booth 10 is supported by a hanger 24 which is attached to a monorail trolley 26 that is supported by and moves along a rail 28 attached to the header member 20. The plurality of baffles 12 are interposed between the parts 22 being conveyed and the filter 16. Each baffle 12 may be attached at its upper end to a monorail trolley 30 that is supported by and permitted to move along a rail 32 attached to the header member 20. A floor drain pan 34 is provided under the parts 22 being painted and is sloped downwardly toward the collection trough 18. As shown in FIG. 2, which is a front elevation view, partially broken away in cross-section, of the paint spray booth 10, the collection trough 18 slopes downwardly towards a collection bucket 36. The floor drain pan 34 is utilized to allow the paint which drips off the painted parts 22 to drain into the collection trough 18 which, in turn, drains into the collection bucket 36.

Referring now to FIG. 3, a top plan view of a plurality of prior art baffles 40 is illustrated. Each baffle 40 is V-shaped and has sides 42 forming an included angle of approximately 90° therebetween. The baffles 40 are staggered and alternately inverted with respect to one another forming a plurality of inlets 44, a plurality of outlets 46, and a plurality of passageways 48 between sides 42 of adjacent baffles 40 which fluidically interconnect each inlet 44 with a plurality of outlets 46. The baffles 40 are oriented so that their respective sides 42 are positioned at an angle of approximately 45° with respect to the direction of the incoming air flow.

Figure 4:
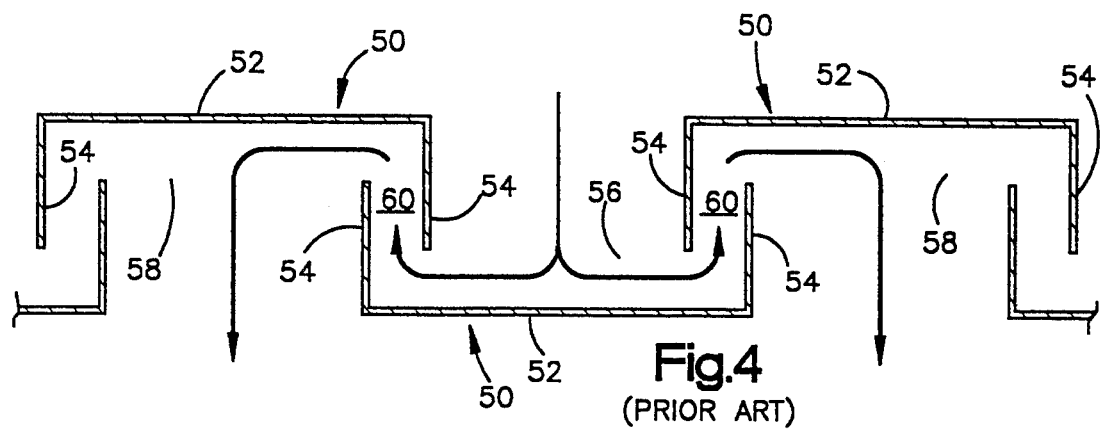
FIG. 4 is a top plan view of a plurality of prior art baffles having a U-shaped configuration.

A top plan view of a plurality of prior art baffles 50 having a different configuration is illustrated in FIG. 4. This baffle arrangement utilizes U-shaped baffles, rather than V-shaped baffles as in FIG. 3. Each baffle 50 is comprised of a substantially flat base portion 52 terminating in a side wall 54 at either end thereof. The side walls 54 are substantially perpendicular to the base portion 52 and substantially parallel to one another. The baffles 50 are staggered and alternately inverted with respect to one another forming a plurality of inlets 56, a plurality of outlets 58, and a plurality of passageways 60 between side walls 54 of adjacent baffles 50 which fluidically interconnect each inlet 56 with a plurality of outlets 58. The baffles 50 are oriented so that the base portion 52 of each baffle is positioned substantially perpendicular to the direction of incoming air flow.

The prior art baffles 40 and 50 shown in FIGS. 3 and 4, respectively have a common disadvantage in that they have a substantial depth and have a minimal "open" area for air flow which increases pressure drops. In addition, the foregoing baffles have been somewhat ineffective with respect to reducing the amount of particulates which reach the paint booth filtration system.

Figure 5:
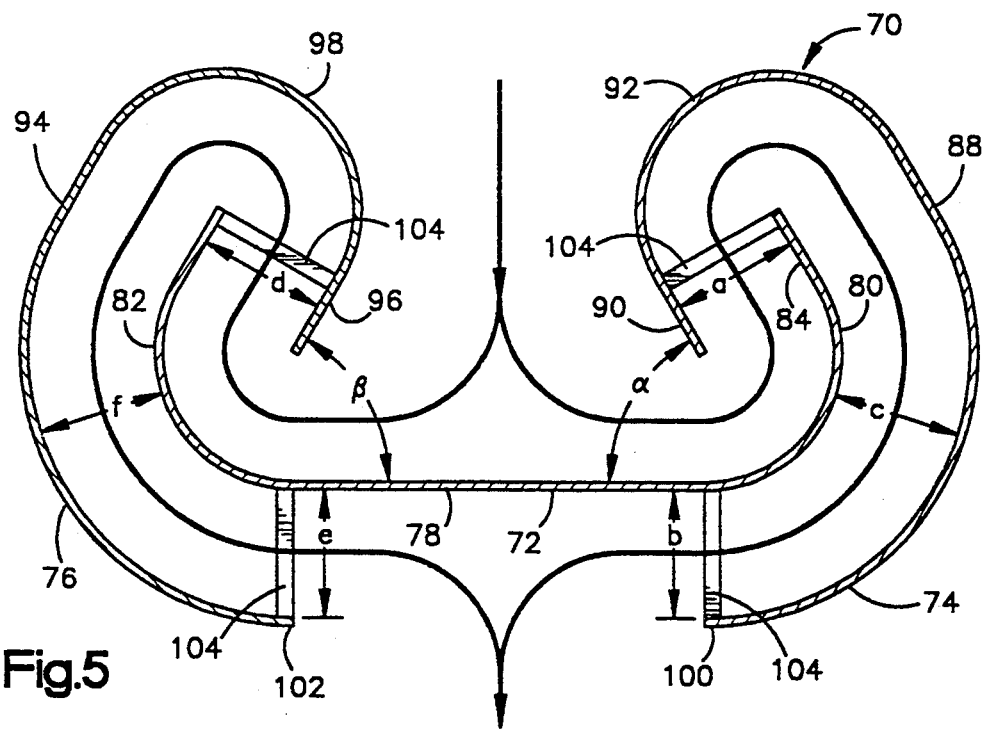
FIG. 5 is a top plan view of a plurality of baffle assemblies of the present invention.

Referring now to FIG. 5, a top plan view of a plurality of baffle assemblies 70 of the present invention is illustrated. Each baffle assembly 70 is comprised of an inner plate 72, a right outer plate 74 and a left outer plate 76. The direction of air travel through the baffle assembly 70 is shown by the dotted lines in FIG. 5. As can be seen, air flows between the inner plate 72 and the outer plates 74, 76 in a first curved direction and then in a second opposite curved direction. The inner plate 72 is comprised of a longitudinally extending planar portion 78 which is oriented substantially perpendicular to the direction of incoming air flow and longitudinally extending outer ends, shown generally by the numerals 80 and 82, which are curved in an upstream direction and inwardly toward each other. The radius of curvature for each outer end 80, 82 is substantially the same and is such so that the included angle between the tip of each outer end 80, 82 and planar portion 78 is approximately 60 degrees. Each outer end 80, 82 of inner plate 72 terminates in a longitudinally extending straight portion 84, 86, respectively. Right outer plate 74 is comprised of a longitudinally extending curved portion 88, a longitudinally extending straight portion 90, and a longitudinally extending semicircular portion 92 interposed therebetween. Similarly, left outer plate 76 is comprised of a longitudinally extending curved portion 94, a longitudinally extending straight portion 96, and a longitudinally extending semicircular portion 98 interposed therebetween. Inner plate 72 is received and positioned within right outer plate 74 and left outer plate 76 so that its outer end 80 is substantially surrounded by and equidistant from right outer plate 74, and its outer end 82 is substantially surrounded by and is equidistant from left outer plate 76. In this orientation, the distance a between the inner surface of straight portion 90 of right outer plate 74 and the adjacent surface of straight portion 84 of outer end 80 of inner plate 72, and the distance b between the inner surface of end 100 of curved portion 88 of right outer plate 74 and the adjacent surface of outer end 80 of inner plate 72 are substantially the same and equal to the distance c between the outer surface of the outer end 80 of inner plate 72 and the adjacent inner surface of right outer plate 74. Similarly, the distance d between the inner surface of straight portion 96 of left outer plate 76 and the adjacent surface of straight portion 86 of outer end 82 of inner plate 72, and the distance e between the inner surface of end 102 of curved portion 94 of left outer plate 76 and the adjacent surface of outer end 82 of inner plate 72 are substantially the same and equal to the distance f between the outer surface of end 82 of inner plate 72 and the adjacent inner surface of left outer plate 76. In this orientation, the included angle α between straight portion 90 of right outer plate 74 and planar portion 78 of inner plate 72 is approximately 60 degrees, and the included angle β between straight portion 96 of left outer plate 76 and planar portion 78 of inner plate 72 is also approximately 60 degrees. The inner plate 72, right outer plate 74 and left outer plate 76 comprising each baffle assembly 70 are maintained in the foregoing orientation by cylindrical spacers 104 which are provided between the inner plate 72 and the outer plates 74, 76. The cylindrical spacers 104 are positioned between and interconnect straight portion 84, 86 of inner plate 72 with straight portions 90, 96 of outer plates 74 and 76, respectively. In addition, cylindrical spacers 104 are positioned between and interconnect planar portion 78 of inner plate 72 with ends 100, 102 of outer plates 74 and 76, respectively.

Figure 6:
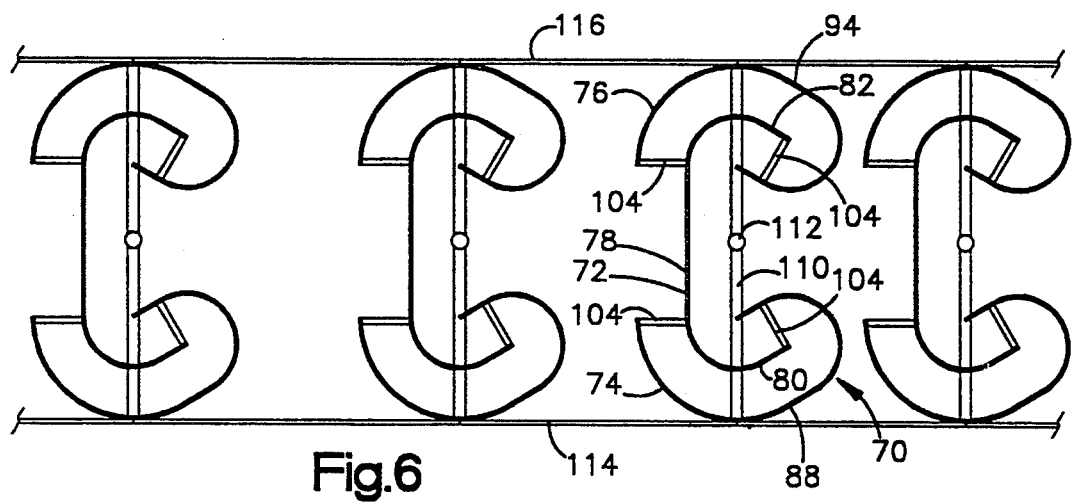
FIG. 6 is a top plan view of a plurality of baffle assemblies of the present invention and illustrates the baffle assemblies in a "close packed" relationship.
Figure 7:
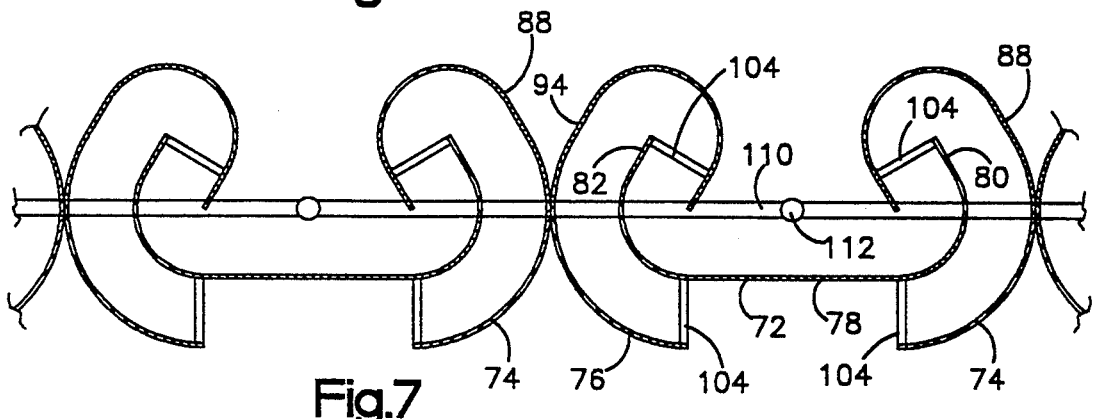
FIG. 7 is a top plan view of a plurality of baffle assemblies of the present invention and illustrates the orientation of the baffle assemblies to intercept air flow.
Figure 8:
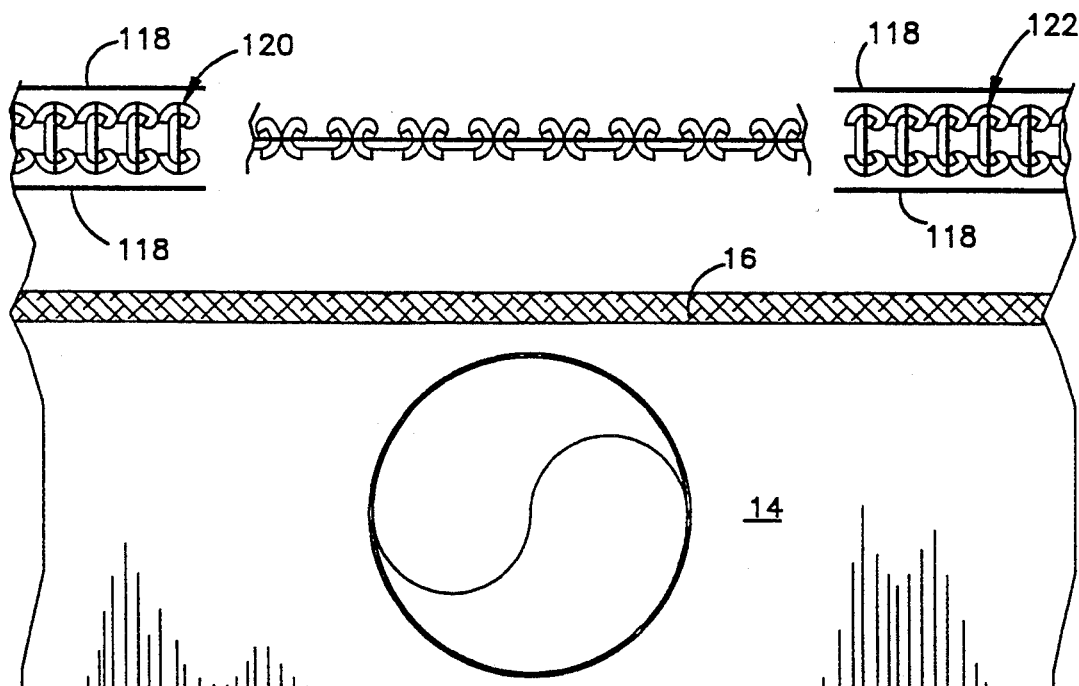
FIG. 8 is a top plan view of a paint spray booth and illustrates the baffle assemblies of the present invention in both a "closed packed" orientation and in an orientation to intercept air flow.

Each baffle assembly 70 is attached at its upper end to a monorail trolley 30 that is supported by and moves along a rail 32 attached to the header member 20. The baffle assemblies 70 are interconnected in a vertical blind type arrangement permitting rotation of the baffle assemblies and "close packing" of same when not in use. As shown in FIG. 6, a rod 110 is attached to the top of each baffle assembly 70 and is positioned so as to be substantially parallel to the planar portion 78 of the inner plate 72 of the baffle assembly 70 and passes through the curved portions 88, 94 of outer plates 74, 76, respectively and outer ends 80, 82 of inner plate 72 of the baffle assembly 70. The approximate center of rod 110 is connected to a pin 112 which is connected to a monorail trolley 30 which moves along rail 32 attached to header member 20. In this manner, each baffle assembly 70 is supported by a monorail trolley 30. The outer surface of the curved portion 88 of the right outer plate 74 of each baffle assembly 70 is interconnected by a chain 114. Similarly, the outer surface of the curved portion 94 of the left outer plate 76 of each baffle assembly 70 is interconnected by a chain 116. The length of chain 114 or 116 between adjacent baffle assemblies 70 approximates the total width of the baffle assembly 70 at its widest point in a direction parallel to the planar portion 78 of inner plate 72 of the assembly. As chains 114 and 116 are pulled to the right at the same speed, the baffle assemblies 70 move toward the right and the spacing between same decreases. Eventually, the baffle assemblies 70 contact one another and are oriented in a "close packed" relationship. Conversely, as chains 114 and 116 are pulled to the left at the same speed, the baffle assemblies 70 move toward the left and the spacing between same increases until the chains 114 and 116 become taut. After the chains 114 and 116 become taut, if chain 116 is pulled to the left while chain 114 is pulled to the right, each baffle assembly 70 will rotate approximately 90° in a counterclockwise direction until the planar portion 78 of each inner plate 72 is substantially perpendicular to the direction of air flow and the right outer plate 74 of each baffle assembly 70 contacts the left outer plate 76 of the adjacent baffle assembly 70, as shown in FIG. 7. In this manner, the baffle assemblies 70 are in the proper position to intercept air flow since the planar portion 78 of each baffle assembly 70 is substantially perpendicular to the direction of air flow. To return the baffle assemblies 70 to a "close packed" orientation, chain 116 is pulled to the right while chain 114 is pulled to the left, causing each baffle assembly 70 to rotate approximately 90 degrees in a clockwise direction. If each chain 114 and 116 is then pulled to the right at the same speed, the baffle assemblies 70 will move to the right and the spacing between the monorail trolleys supporting same will decrease until the baffle assemblies 70 contact one another forming a "close packed" relationship. As shown in FIG. 8, the baffle assemblies 70, when in a "closed packed" orientation, can be received between substantially parallel sheet metal shields 118. Two sets 120, 122 of baffle assemblies 70 can be provided and arranged so that one set is retracted to the right while the other set is retracted to the left, and, when retracted, each set of baffle assemblies is received within substantially parallel sheet metal shields 118. In this arrangement, before the paint spray booth 10 is used, each set 120, 122 of baffle assemblies 70 is withdrawn from its associated metal shields 118 and are brought together at the approximate center of the booth 10 and rotated approximately 90° in a clockwise direction so the right end of baffle assembly set 120 contacts the left end of baffle assembly set 122 thus providing a baffle covering for the painting opening, shown by the numeral 124, in the paint spray booth 10.

Figure 9:
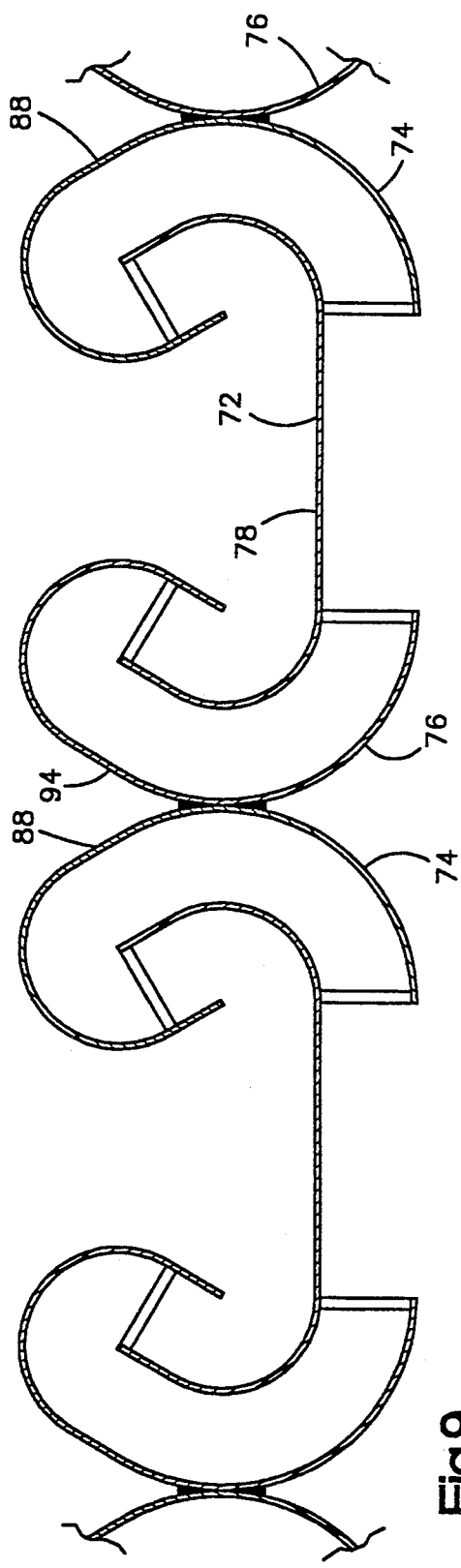
FIG. 9 is a top plan view of the present invention and illustrates the orientation of each baffle assembly with respect to its adjacent baffle assemblies when the baffle assemblies are joined to one another, such as by spot welding.
Figure 10:
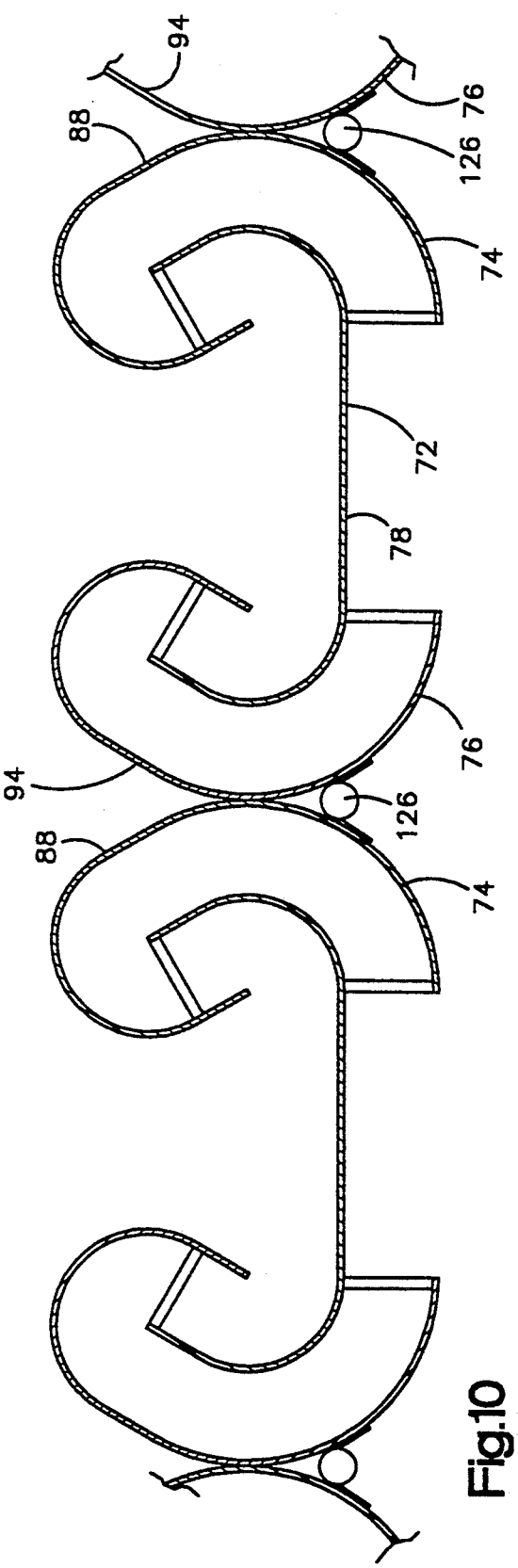
FIG. 10 is a top plan view of the present invention and illustrates the orientation of each baffle assembly with respect to its adjacent baffle assemblies when the baffle assemblies are joined to one another by a hinge arrangement.

Rather than using a movable vertical blind type arrangement for the suspension and rotation of the baffle assemblies 70, the baffle assemblies can be joined to one another by various fastening techniques, such as spot welding. Referring to FIG. 9, in this case the baffle assemblies 70 are aligned so that the planar portions 78 of the inner plates 72 are substantially co-linear. When in this orientation, the outer surface of the right outer plate 74 of each baffle assembly 70 is attached or fastened to the outer surface of the left outer plate 76 of the adjacent baffle assembly 70. Alternatively, the baffle assemblies 70 can be connected by a hinge, as illustrated in FIG. 10. In this case, the baffle assemblies 70 are again aligned so that the planar portions 78 of the inner plates 72 are substantially co-linear. When in this orientation, a hinge 126 is attached to the outer surface of curved portions 88, 94 of right outer plate 74 and left outer plate 76, respectively, of adjacent baffle assemblies 70.

The baffle assemblies 70 of the present invention can be utilized in a dry booth environment in which filters collect any overspray which passes through the baffles, such as that previously described and illustrated, or in a waterwash booth which utilizes various types of water-capturing curtains or devices located behind the baffles. In addition, the baffle assemblies 70 can be retrofitted into existing spray booths, either of the dry type or water-wash type.

Tests were conducted to compare the collection efficiency of the baffle assemblies 70 of the present invention to that of a V-shaped baffle assembly, such as illustrated in FIG. 3. In these tests, a dry spray booth was modified to provide a 27' high by 36' wide opening. Tests were conducted by atomizing ethylene glycol through a spray gun positioned at a distance of 4 to 5 feet from the opening. The average velocity of the atomized ethylene glycol through the opening was measured to be 379 feet/minute. Two baffle arrangements, one being structurally similar to baffle assemblies 70 of the present invention and the other being similar to the V-shaped baffles illustrated in FIG. 3 were each placed over the foregoing opening and atomized ethylene glycol was again directed toward the opening at the aforementioned velocity. The V-shaped baffles provided a .30 w.c. pressure drop and an average exit velocity of 191 feet/minute. The average collection efficiency over three tests was 49.5%. The V-shaped baffles provided a 45% reduction in velocity variation over the opening. In contrast, the baffle assemblies 70 of the present invention provided a .35 w.c. pressure drop and an average exit velocity of 155 feet/minute. The average collection efficiency over four tests was 92.2% In addition, the baffle assemblies 70 of the present invention provided a 65% reduction in velocity variation over the opening. Furthermore, the baffle assemblies 70 of the present invention provided noticeable noise reduction compared to the V-shaped baffles or the open booth.

In summary, the baffle assemblies 70 of the present invention produce significantly greater collection efficiency, thus reducing the amount of particulates reaching the booth filtration system. Reduction in particulates reaching the filtration system results in less overspray reaching the booth filters or water curtain. Thus, filters in "dry booths" will last longer and liquid sludge build-up will occur over a longer period of time thus making the disposal of same less frequent in water-wash booths.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A baffle arrangement for removing particles from an air stream passing therethrough, said baffle arrangement comprising:

a first plate member comprising a longitudinally extending planar portion and oppositely disposed longitudinally extending curved outer ends, said longitudinally extending planar portion being interposed between said oppositely disposed longitudinally extending curved outer ends, a second plate member comprising a longitudinally extending first curved portion and a longitudinally extending second curved portion, said longitudinally extending first curved portion having a curvature which approximates the curvature of one of said longitudinally extending curved outer ends of said first plate member, said longitudinally extending first curved portion terminating in said longitudinally extending second curved portion of said second plate member; and a third plate member comprising a longitudinally extending first curved portion and a longitudinally extending second curved portion, said longitudinally extending first curved portion having a curvature which approximates the curvature of the other of said longitudinally extending curved outer ends of said first plate member, said longitudinally extending first curved portion terminating in said longitudinally extending second curved portion of said third plate member, said first plate member being received and positioned within said second plate member and said third plate member so that said one of said longitudinally extending curved outer ends of said first plate member is substantially surrounded by said second plate member, and said other of said longitudinally extending curved outer ends of said first plate member is substantially surrounded by said third plate member.

2. The baffle arrangement as defined in claim 1 wherein said one of said longitudinally extending curved outer ends of said first plate member is substantially equidistant from said second plate member and said other of said longitudinally extending curved outer ends of said first plate member is substantially equidistant from said third plate member.

3. The baffle arrangement as defined in claim 1 wherein said outer ends of said first plate member are curved inwardly toward one another.

4. The baffle arrangement as defined in claim 1 wherein said second plate member further includes a longitudinally extending straight portion, said longitudinally extending second curved portion of said second plate member being interposed between said longitudinally extending straight portion and said longitudinally extending first curved portion of said second plate member and wherein said third plate member further includes a longitudinally extending straight portion, said longitudinally extending second curved portion of said third plate member being interposed between said longitudinally extending straight portion and said longitudinally extending first curved portion of said third plate member.

5. The baffle assembly as defined in claim 4 wherein the included angle between said longitudinally extending straight portion of said second plate member and said planar portion of said first plate member and the included angle between said longitudinally extending straight portion of said third plate member and said planar portion of said first plate member is approximately 60°.

6. The baffle arrangement as defined in claim 1 wherein the configuration of said longitudinally extending second curved portion of said second plate member and the configuration of said longitudinally extending second curved portion of said third plate member are substantially semi-circular.

7. The baffle arrangement as defined in claim 1 further including means for maintaining the position of said first plate member with respect to said second plate member and said third plate member.

8. The baffle arrangement as defined in claim 7 wherein said position maintaining means comprises a plurality of spacers positioned between said first plate member and said second plate member and said between said first plate member and said third plate member.

9. The baffle assembly as defined in claim 1 further including means for operatively connecting a second plate member of one baffle assembly to a second plate member of an adjacent baffle assembly and means for operatively connecting a third plate member of said one baffle assembly to a third plate member of said adjacent baffle assembly.

10. The baffle assembly as defined in claim 9 further including means for rotating said one baffle assembly and said adjacent baffle assembly.

11. The baffle assembly as defined in claim 9 further including means for varying the longitudinal distance between said one baffle assembly and said adjacent baffle assembly.

12. The baffle assembly as defined in claim 1 further including means for operatively connecting a second plate member of one baffle assembly to a third plate member of an adjacent baffle assembly.

13. The baffle assembly as defined in claim 12 wherein said connecting means comprises a hinge member.

* * * * *